United States Patent
Bolton et al.

[11] Patent Number: 6,005,321
[45] Date of Patent: Dec. 21, 1999

[54] VARIABLE RELUCTANCE MOTOR SYSTEMS

[75] Inventors: Hugh Robert Bolton, Cardiff; Jason Lewis, West Glamorgan, both of United Kingdom

[73] Assignee: Switched Reluctance Drives Limited, Harrogate, United Kingdom

[21] Appl. No.: 09/091,552

[22] PCT Filed: Dec. 17, 1996

[86] PCT No.: PCT/GB96/03114

§ 371 Date: Sep. 18, 1998

§ 102(e) Date: Sep. 18, 1998

[87] PCT Pub. No.: WO97/23941

PCT Pub. Date: Jul. 3, 1997

[30] Foreign Application Priority Data

Dec. 21, 1995 [GB] United Kingdom ............... 9526228

[51] Int. Cl.[6] .................................................. H02K 19/06
[52] U.S. Cl. ........................ 310/168; 310/186; 310/167; 318/701
[58] Field of Search .................................... 310/186, 185, 310/188, 189, 168, 172, 269, 173, 167, 170, 166; 318/701

[56] References Cited

U.S. PATENT DOCUMENTS 4,942,345  7/1990  Horst ........................................ 318/254

FOREIGN PATENT DOCUMENTS

| 0 528 750 | 2/1993  | European Pat. Off. . |
| 0 695 020 | 1/1996  | European Pat. Off. . |
| 2 490 034 | 3/1982  | France . |
| 40 03 455 | 8/1991  | Germany . |
| 40 12 561 | 10/1991 | Germany . |
| 61-52182  | 3/1986  | Japan . |

*Primary Examiner*—Nestor Ramirez
*Assistant Examiner*—Burton Mullins
*Attorney, Agent, or Firm*—Patterson & Keough, P.A.

[57] ABSTRACT

A hybrid single-phase variable reluctance motor system has a stator (1) having a pair of oppositely disposed salient main poles (4) provided with main windings (12) and at least one pair of oppositely disposed salient auxiliary poles (5, 6) provided with auxiliary windings (13, 14) and disposed intermediate the main poles (4) on the stator (1). Furthermore the motor system has a rotor (2) having a pair of oppositely disposed salient poles (7) without windings. Additionally the motor system includes a control circuit (11) for rotating the rotor (2) during normal running by supplying current pulses to the main stator windings (12) in synchronism with rotation of the rotor (2) and for rotating the rotor (2) on starting by supplying current pulses to both the main and auxiliary stator windings (12, 13, 14) in synchronism with rotation of the rotor (2). By supply of current pulses to the auxiliary stator windings as well as the main stator windings on starting, it is possible to ensure that positive torque can be produced at substantially all rotor positions, thus guaranteeing that the motor system can be started regardless of the position in which the rotor has previously come to rest.

16 Claims, 1 Drawing Sheet

VARIABLE RELUCTANCE MOTOR SYSTEMS

BACKGROUND OF THE INVENTION

1. Field of the Invention

This invention relates to variable reluctance motor systems.

2. Description of Related Art

A single phase variable reluctance motor system typically comprises a stator having a pair of oppositely disposed salient poles provided with energising windings, a rotor having a pair of oppositely disposed salient poles without windings, and a control circuit for rotating the rotor by supplying current pulses to the stator windings in synchronism with rotation of the rotor. Such a motor system offers the advantage, over a conventional motor system having rotor windings, that commutator brushes, which are wearing parts, are not required for supply of current to the rotor. Furthermore significant advantages over other motor systems are provided by the fact that there are no conductors on the rotor, and high-permanence magnets are not used in the motor construction.

However, although they are simple in construction, conventional single phase variable reluctance motor systems suffer from the fact that they are non-self-starting since it is inherent in their construction that positive torque is available for only 180° at most per 360° cycle, and there are large zones (of about 90°) intermediate the stator poles where positive torque is not available so that, if the rotor has stopped with its poles orientated in these zones, the motor system cannot be re-started without first having to turn the rotor to a position in which torque becomes available. This rules out such single phase variable reluctance motor systems for certain applications and in particular for driving difficult loads such as those which combine direct drive and high friction, for instance.

SUMMARY OF THE INVENTION

It is an object of the invention to provide a hybrid single-phase variable reluctance motor system which is capable of generating driving torque for starting at substantially all rotor positions.

According to the present invention there is provided a hybrid single-phase variable reluctance motor system comprising a stator having a pair of substantially oppositely disposed salient main poles provided with at least one main winding and oppositely disposed salient auxiliary poles provided with at least one auxiliary winding and disposed intermediate the main poles on the stator, a rotor having a pair of substantially oppositely disposed salient poles without windings, and control means for rotating the rotor during normal running by supplying current pulses to said at least one main stator winding in synchronism with rotation of the rotor and for rotating the rotor on starting and/or low speed operation by supplying current pulses to both the main and auxiliary stator windings in synchronism with rotation of the rotor, wherein two pairs of oppositely disposed salient auxiliary poles provided with auxiliary windings are disposed on the stator intermediate the main poles By supply of current pulses to the auxiliary stator windings as well as the main stator windings on starting, it is possible to ensure that positive torque can be produced at substantially all rotor positions, thus guaranteeing that the motor system can be started regardless of the position in which the rotor has previously come to rest. Preferably the arrangement is such as to be capable of generating bidirectional driving torque at all rotor positions on starting, thus rendering both starting in either direction and reversing possible, whilst allowing the normal advantages associated with a single-phase variable reluctance motor system during normal running. Such advantages include high efficiency at high speed due to the lower iron losses associated with lower pulsing frequency as compared with variable reluctance motor systems of two or more phases.

BRIEF DESCRIPTION OF THE DRAWINGS

In order that the invention may be more fully understood, a preferred embodiment of hybrid single-phase variable reluctance motor system in accordance with the invention will now be described, by way of example, with reference to the accompanying drawing, in which.

DETAILED DESCRIPTION OF PREFERRED EMBODIMENTS

Figure 1:
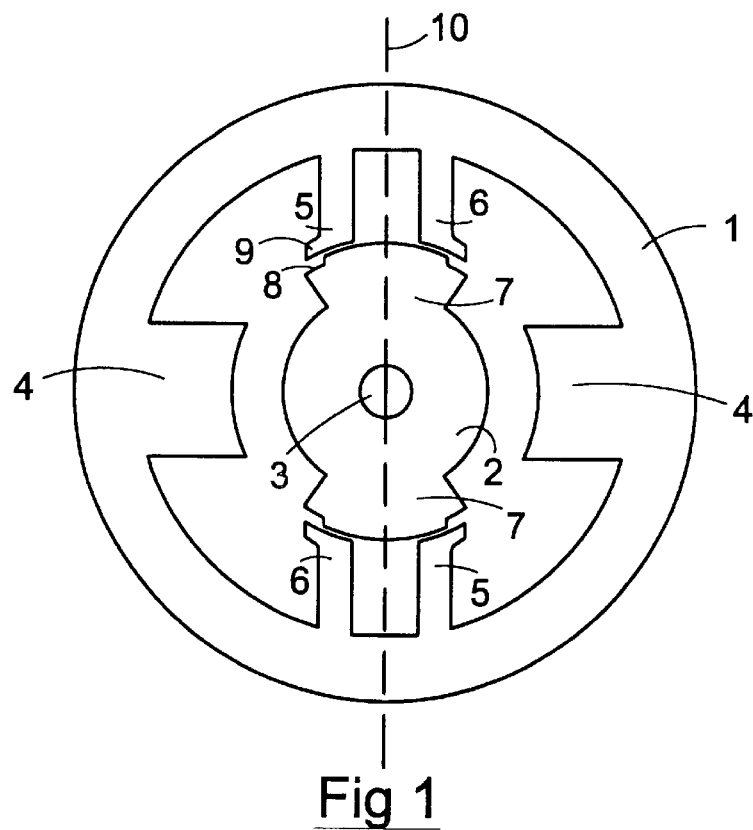
FIG. 1 is a diagrammatic cross-section through the rotor and stator of the system.

Referring to FIG. 1 the illustrated hybrid 6/2 single phase variable reluctance motor system comprises an annular stator 1 surrounding a rotor 2 mounted on a rotary shaft 3. The stator 1 is provided with a pair of oppositely disposed inwardly directed salient main poles 4 provided with main windings (not shown) and two pairs of oppositely disposed inwardly directed salient auxiliary poles 5,6 provided with auxiliary windings (not shown) and disposed intermediate the main poles 4 on the stator 1. The rotor 2 has a pair of oppositely disposed outwardly directed salient poles 7 without windings having stepped end portions 8 serving to increase the starting torque at certain rotor positions.

The auxiliary stator poles 5,6 are disposed symmetrically in relation to the plane 10 midway between the main stator poles 4 with, in each case, the two poles of each pair being disposed diametrically opposite one another and on opposite sides of the midway plane 10. Additionally the auxiliary stator poles 5,6 have end portions 9 which project in the direction of the adjacent main stator pole 4 and are approximately aligned with the rotor pole end portions 8 in the position of the rotor shown in FIG. 1.

Figure 2:
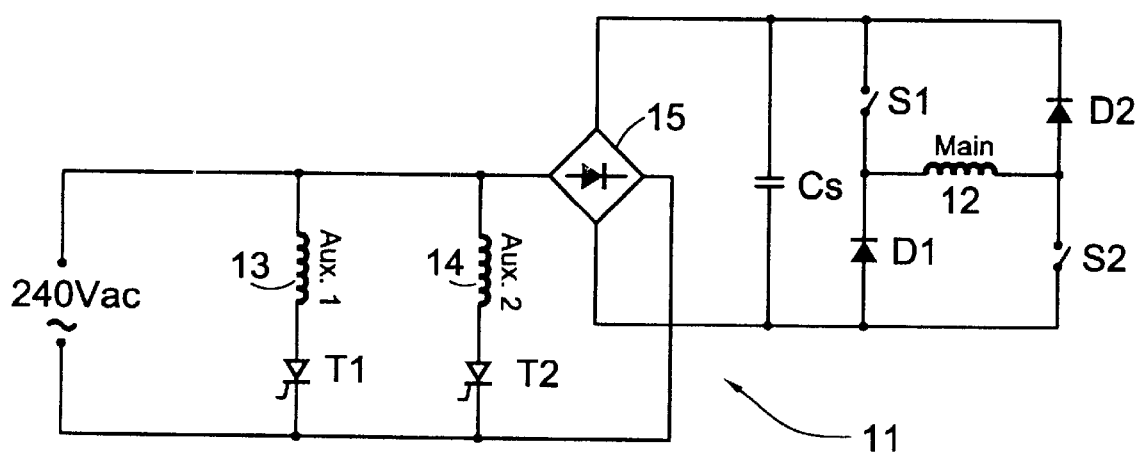
FIG. 2 is a circuit diagram of the control circuit of the system.

The control circuit 11 shown in FIG. 2 is adapted to be connected to a 240 V ac mains supply, and serves to supply current pulses to the main stator windings 12 synchronised with the rotation of the rotor to produce rotor defining single phase operation of the motor system during normal running. Additionally the control circuit 11 serves to supply current pulses to the auxiliary stator windings 13, 14 provided on the auxiliary stator poles 5, 6 and providing two auxiliary phases which, together with the main phase produced by simultaneous supply of current pulses to the main stator windings 12, serves to effect starting of the motor system.

Since the auxiliary phases are used only at low speed, their excitation arrangements can be made fairly simple. In the circuit arrangement of FIG. 2, each auxiliary stator winding 13 or 14 has a thyristor T1 or T2 associated with it and is connected directly across the live and neutral connections of the a.c. mains supply, thus minimising the number of power switches and electronic components required to control the auxiliary phases. Alternatively the auxiliary phases may be switched using triacs as opposed to thyristors, thus enabling both positive and negative half cycles of the mains supply to be used to supply the auxiliary stator windings 13, 14. On starting the stator windings 12, 13 and 14 are energised in sequence as the rotor rotates in a manner similar to that used in standard polyphase variable reluctance motors.

The control circuit 11 includes a rectifying bridge 15 and a smoothing capacitor Cs connected across the output of the bridge 15. An asymmetrical half bridge arrangement consisting of two diodes D1, D2 and two switching devices S1, S2 is connected to the output of the bridge 15 for supplying energising pulses to the main stator windings 12 (which are connected in series). Both the auxiliary and main phases are used to start the motor system by firing of the thyristors T1, T2 and switching of the switching devices S1, S2 so as to provide sequential excitation of the auxiliary and main phases in the manner of a three phase motor. However, once the motor system has been accelerated to the desired speed, excitation of the auxiliary phases is stopped and single phase operation is effected by excitation of the main phase only. Thus only the main phase is used at high speed running and low load torque, whereas three phase operation is used at low speed and high load torque, particularly during starting and reversing.

Various modifications of the above described arrangement can be contemplated within the scope of the invention. For example, instead of the stator surrounding the rotor as described, the rotor may surround the stator in a modified arrangement in accordance with the invention. Furthermore, only one pair of auxiliary stator poles may be provided, and, instead of windings being provided on both main stator poles and/or both auxiliary stator poles of the or each pair, windings may be provided on only one pole of the pair in each case. Instead of the auxiliary stator windings being driven by an ac circuit, such windings may be driven by a dc circuit in known manner.

We claim:

1. A single-phase variable reluctance motor system comprising:
   a stator having a pair of substantially oppositely disposed salient main poles, a main winding comprising at least one coil disposed in relation to the main poles, two pairs of salient auxiliary poles disposed symmetrically in relation to a plane that is midway between the salient main poles, each of the pairs of auxiliary poles comprising substantially oppositely disposed salient poles, and two auxiliary windings each comprising at least one coil disposed in relation to the auxiliary poles,
   a rotor having a pair of substantially oppositely disposed salient poles, and
   control electronics for supplying current pulses to the main and auxiliary windings,
   wherein the control electronics are adapted to control the main and auxiliary windings as a three-phase motor at starting.

2. A motor system according to claim 1, wherein the control electronics comprise at least one thyristor or triac in electrical communication with the auxiliary windings, and at least one diode in electrical communication with the main winding.

3. A hybrid single-phase variable reluctance motor system comprising a stator (1) having a pair of substantially oppositely disposed salient main poles (4) provided with at least one main winding (12) and oppositely disposed salient auxiliary poles (5, 6) provided with at least one auxiliary winding (13, 14) and disposed intermediate the main poles (4) on the stator (1), a rotor (2) having a pair of substantially oppositely disposed salient poles (7) without windings, and control means (11) for rotating the rotor (2) during normal running by supplying current pulses to said at least one main stator winding (12) in synchronism with rotation of the rotor (2) and for rotating the rotor (2) on starting and/or low speed operation by supplying current pulses to both the main and auxiliary stator windings (12, 13, 14) in synchronism with rotation of the rotor (2), wherein two pairs of oppositely disposed salient auxiliary poles (5, 6) provided with auxiliary windings (13, 14) are disposed on the stator (1) intermediate the main poles (4), wherein the two pairs of auxiliary stator poles (5, 6) are disposed symmetrically in relation to the plane (10) midway between the main stator poles (4) with, in each case, the two poles (5, 6) of each pair being disposed diametrically opposite one another and on opposite sides of the midway plane (10), wherein the control means (11) is adapted to control the main and auxiliary stator windings (12, 13, 14) as a three-phase motor on starting.

4. A motor system according to claim 3, wherein the control means (11) includes at least one thyristor (T1, T2) for supplying current pulses to said auxiliary stator winding (13, 14) on starting.

5. A motor system according to claim 3 wherein the control means (11) includes at least one triac for supplying current pulses to said auxiliary stator windings (13, 14) on starting.

6. A motor system according to claim 3, which is adapted to be connected to an alternating current supply, wherein the control means (11) includes rectifying means (15) for providing a rectified current supply for driving said at least one main stator winding (12) but not said auxiliary stator windings (13, 14) which are driven by the alternating current supply.

7. A motor system according to claim 3, wherein the rotor poles (7) have peripheral end portions (8) which are stepped to increase the starting torque available at certain rotor positions.

8. A motor system according to claim 7, wherein, when the rotor (2) is orientated so that the rotor poles (7) are symmetrically aligned with the auxiliary stator poles (5, 6), the stepped end portions (8) of the rotor poles (7) are aligned with projecting end portions (9) of the auxiliary stator poles (5, 6).

9. A motor system according to claim 1, wherein the auxiliary stator poles (5, 6) have peripheral end portions (9) which project in the direction of the adjacent main stator pole (4).

10. A single-phase variable reluctance motor system comprising:
    a stator having a pair of substantially oppositely disposed salient main poles, a main winding comprising at least one coil disposed in relation to the main poles, two pairs of salient auxiliary poles disposed symmetrically in relation to a plane that is midway between the salient main poles, each of the pairs of auxiliary poles comprising substantially oppositely disposed salient poles, and two auxiliary windings each comprising at least one coil disposed in relation to the auxiliary poles,
    a rotor having a pair of substantially oppositely disposed salient rotor poles,
    first control means for supplying unidirectional current pulses to the main winding, and
    second control means for supplying bi-directional current pulses to both of the auxiliary windings,
    wherein the first and second control means are adapted to control the main and auxiliary windings as a three-phase motor at starting.

11. A motor system according to claim 10, wherein the second control means includes at least one triac.

12. A motor system according to claim 10, wherein the auxiliary stator poles have peripheral end portions that project in the direction of the main stator poles.

13. A motor system according to claim 10, wherein the second control means includes at least one thyristor.

14. A motor system according to claim 13, wherein the rotor poles have peripheral end portions that are stepped to increase the starting torque available at certain rotor positions.

15. A motor system according to claim 10, wherein the rotor poles have peripheral end portions that are stepped to increase the starting torque available at certain rotor positions.

16. A motor system according to claim 15, wherein the auxiliary stator poles have peripheral end portions that project in the direction of the main stator poles.

* * * * *